`US010857638B2`

United States Patent
Stark

(10) Patent No.: US 10,857,638 B2
(45) Date of Patent: Dec. 8, 2020

(54) VISE CLAMP

(71) Applicant: Michael W Stark, Lake Oswego, OR (US)

(72) Inventor: Michael W Stark, Lake Oswego, OR (US)

( * ) Notice: Subject to any disclaimer, the term of this patent is extended or adjusted under 35 U.S.C. 154(b) by 237 days.

(21) Appl. No.: 15/678,873

(22) Filed: Aug. 16, 2017

(65) Prior Publication Data
US 2019/0054584 A1 Feb. 21, 2019

(51) Int. Cl.
*B23Q 3/06* (2006.01)
*B25B 5/10* (2006.01)

(52) U.S. Cl.
CPC .............. *B23Q 3/069* (2013.01); *B25B 5/105* (2013.01); *B25B 5/106* (2013.01); *B25B 5/107* (2013.01)

(58) Field of Classification Search
CPC ......... B23Q 3/069; B25B 5/105; B25B 5/103; B25B 5/104; B25B 5/166; B25B 3/102; B25B 1/25; B25B 1/28; B25B 1/42; F16B 2/065
USPC ................ 269/243, 93, 94, 91, 92, 209, 258
See application file for complete search history.

(56) References Cited

U.S. PATENT DOCUMENTS

| | | | | | |
|---|---|---|---|---|---|
| 1,676,289 | A | * | 7/1928 | Schmalz | B25B 5/105 269/93 |
| D165,296 | S | * | 11/1951 | Mathison | D8/72 |
| 2,619,010 | A | * | 11/1952 | Mathison | B25B 5/105 269/93 |
| 2,994,236 | A | * | 8/1961 | McCormick | B25B 5/106 269/93 |
| 3,194,548 | A | * | 7/1965 | Zwick | B25B 5/106 269/93 |
| 3,712,606 | A | * | 1/1973 | Cole | B25B 5/106 269/92 |
| 4,304,399 | A | * | 12/1981 | Szugda | B25B 5/104 269/88 |
| 5,025,987 | A | * | 6/1991 | Kotecki | E01B 9/28 238/342 |
| 8,459,624 | B2 | * | 6/2013 | Klippel | B25B 5/105 238/349 |
| 2002/0182003 | A1 | * | 12/2002 | Hardtke | F16B 2/065 403/388 |

\* cited by examiner

*Primary Examiner* — Lee D Wilson
*Assistant Examiner* — Seahee Hong
(74) *Attorney, Agent, or Firm* — Mark S Hubert

(57) ABSTRACT

An adjustable clamp for the retention of a vice or work piece onto a slotted worktable. The clamp has a raised rear foot that both spans the standard width of a slot in a slotted worktable regardless of the angle the clamp is secured to the worktable, and generates an increased gripping force at both contact points of the clamp. Its nose accommodates a cylindrical pin recess to accommodate a cylindrical pin to allow the vice to clamp to a vice with a raised peripheral lip. The 30 degree beveled front edge allows the clamp a substantial planar contact surface with the vice or work piece, enhancing stability.

5 Claims, 10 Drawing Sheets

VISE CLAMP

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to clamps, and more particularly to clamping devices for use in precise machining situations utilizing slotted work tables such as would be found on metal milling or broaching machines.

BACKGROUND

In the field of metalworking, while the majority of the precision attained lies in the hands of the tradesman, the accuracy of the tools themselves also plays a significant. The play or "backlash" in the tooling is one of the sources of inaccuracy and another is the movement between the work piece and the working tool bit. This generally in milling operations is determined by the gripping force of the vise on the work piece and the gripping force of the vise to the slotted worktable.

Prior art vise clamps are merely rectangular metal blocks having upper peripheral flanges and central orifices for the passage of a T nut and a bolt to secure the blocks to the slotted worktable. The problem herein lies when attempting to clamp a vise or work piece that has its own raised, top face peripheral edge. This does not provide a substantial gripping contact and under load may allow the vise or clamped work piece to move. Additionally, since the clamp's body is rectangular, when clamping angularly, it does not allow the clamp's upper peripheral flange to extend onto the vise or work piece a substantial distance because of the physical interference with the clamp's corners. Lastly, because of the large contact area of the bottom face of the clamp, the pressure per square inch is reduced which results in a minimized gripping or clamping ability.

Henceforth, an improved vise clamp for use on a slotted work table that accommodates all styles of vises (with or without raised peripheral edges), can provide a substantial gripping surface, can get its body close or into contact with the vise/work piece, and has an enhanced gripping force, would fulfill a long felt need in the metal machining and fabrication industry. This new invention utilizes and combines known and new technologies in a unique and novel configuration to overcome the aforementioned problems and accomplish this.

BRIEF SUMMARY

In accordance with various embodiments, a clamp for use on a slotted work table that can abut the vise/work piece with one of its body's angled side faces is provided.

In one aspect, a clamp with an extended nose for depth of contact onto the vise/work piece to ensure adequate gripping contact onto the appropriate surface.

In another aspect, a clamp with a radiused linear groove formed thereon to accommodate clamping to a vise with a raise peripheral rib is provided.

In yet another aspect, a clamp is provided capable of generating increased clamping forces/friction on both the slotted table and the vise/work piece.

In yet another aspect, a clamp is provided that has an elongated or elliptical central through bore to accommodate adjustable clamp placement with respect to the location of the work table slots Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
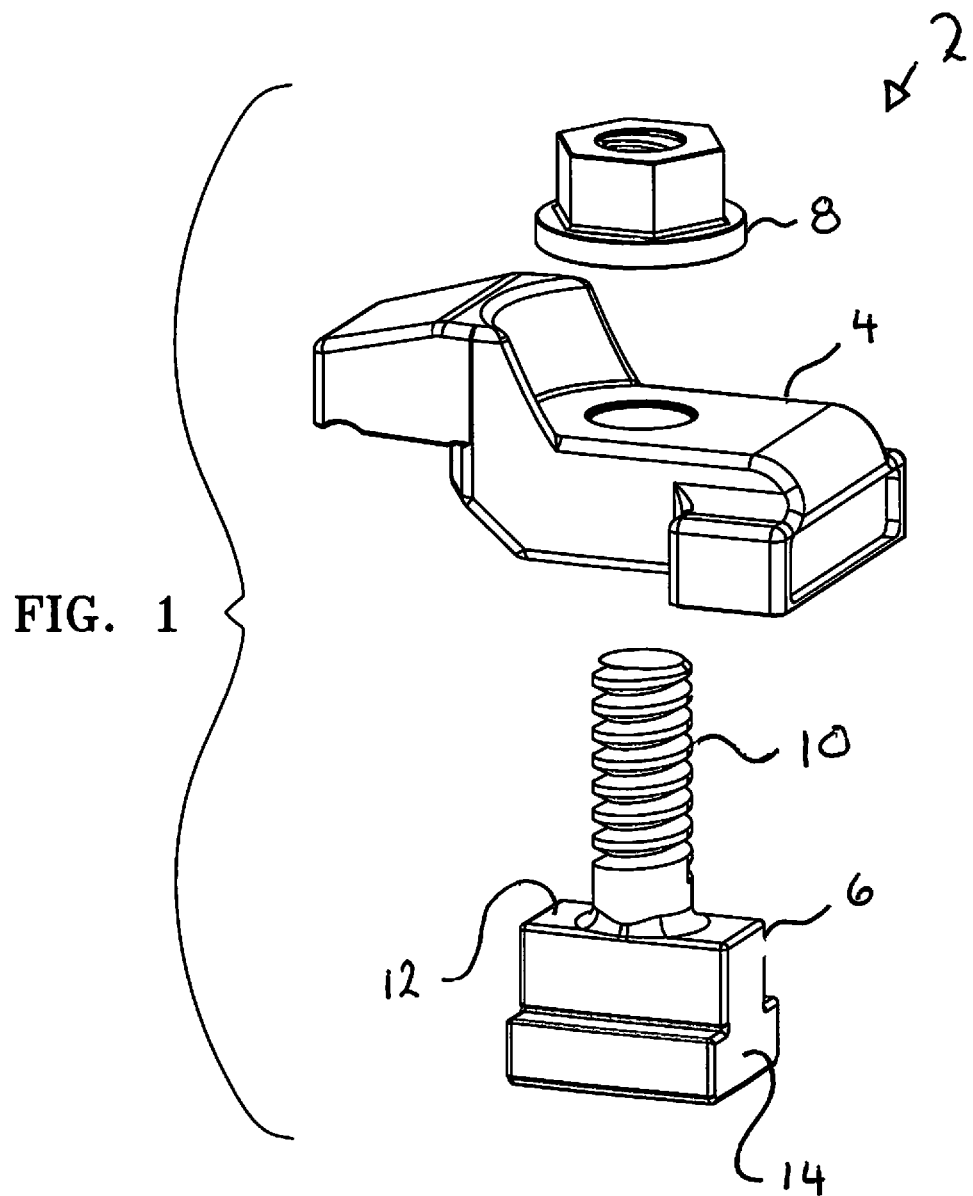
FIG. 1 is an exploded perspective view of the vise clamp.
Figure 2:
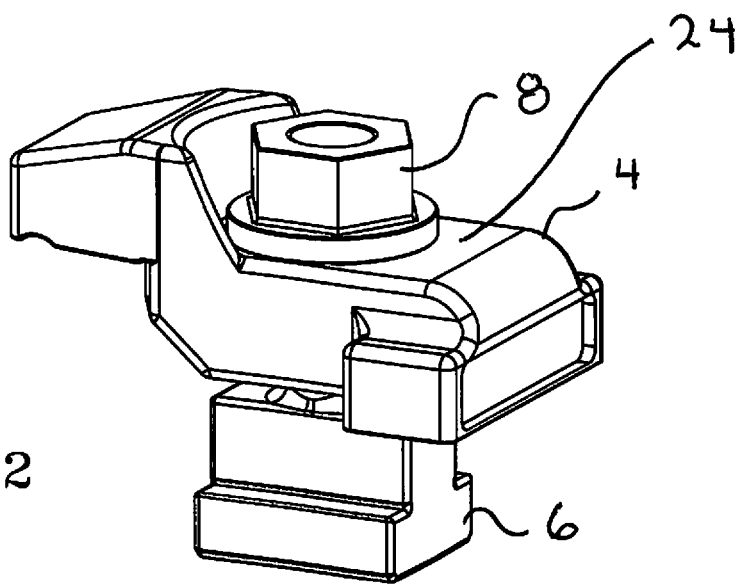
FIG. 2 is an assembled view of the vise clamp.
Figure 3:
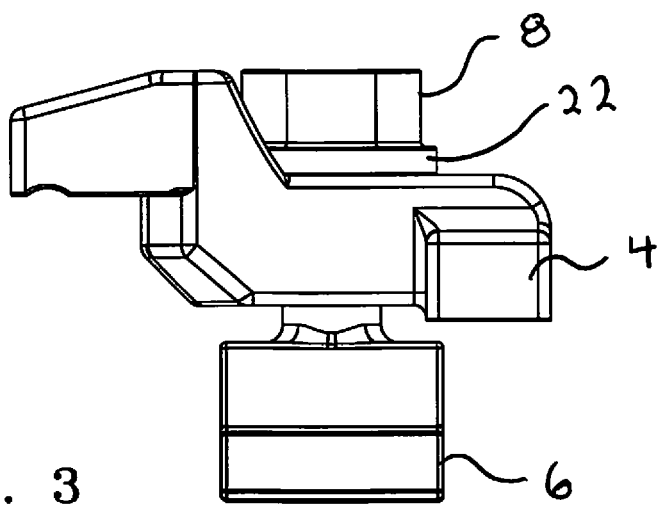
FIG. 3 is a side view of the assembled vise clamp.
Figure 4:
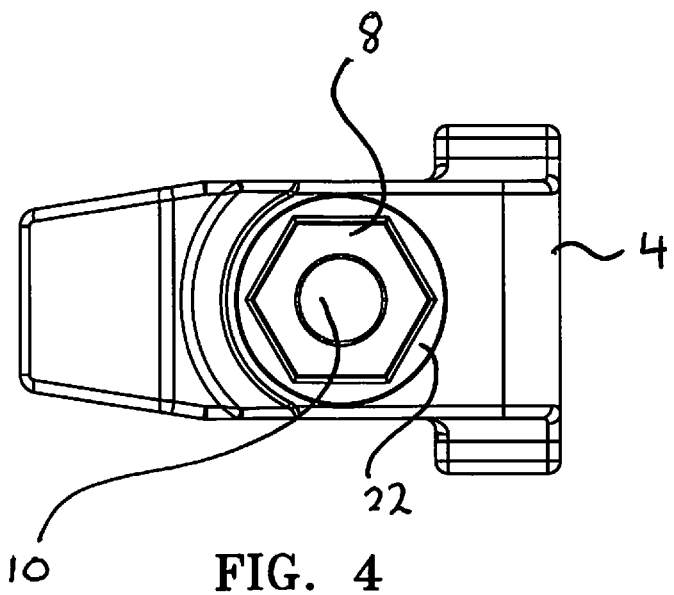
FIG. 4 is a top view of the assembled vise clamp.
Figure 5:
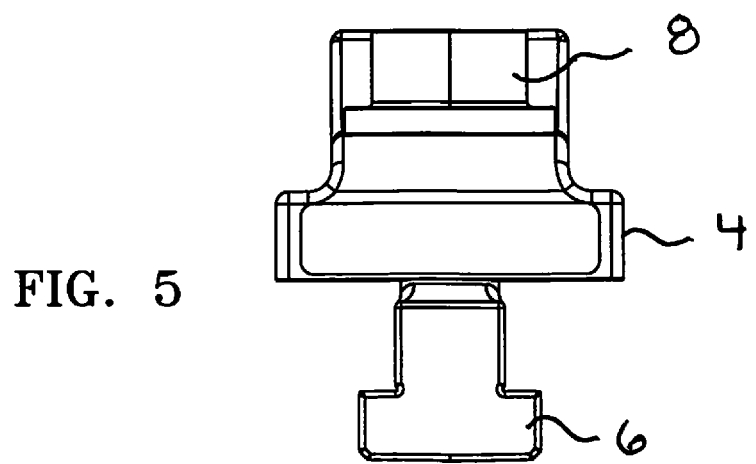
FIG. 5 is a back view of the assembled vise clamp.
Figure 6:
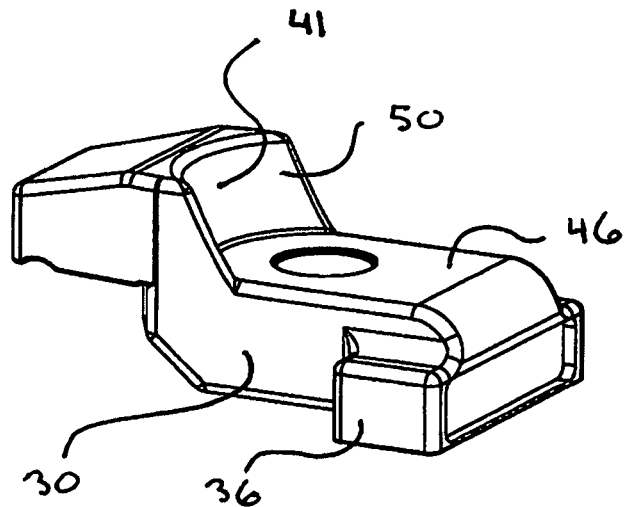
FIG. 6 is a side perspective view of the vise clamp body.
Figure 7:
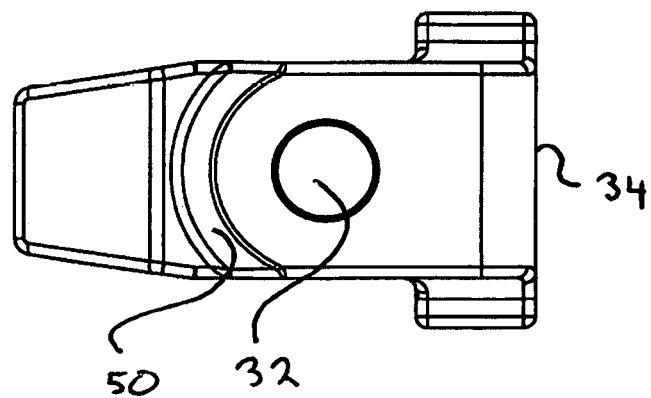
FIG. 7 is a top view of the vise clamp body.
Figure 8:
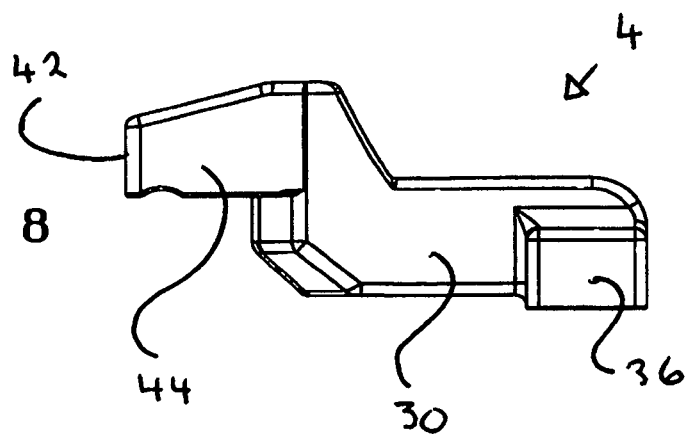
FIG. 8 is a left side view of the vise clamp body.
Figure 9:
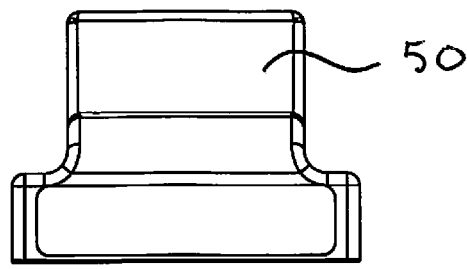
FIG. 9 is a back view of the vise clamp body.
Figure 10:
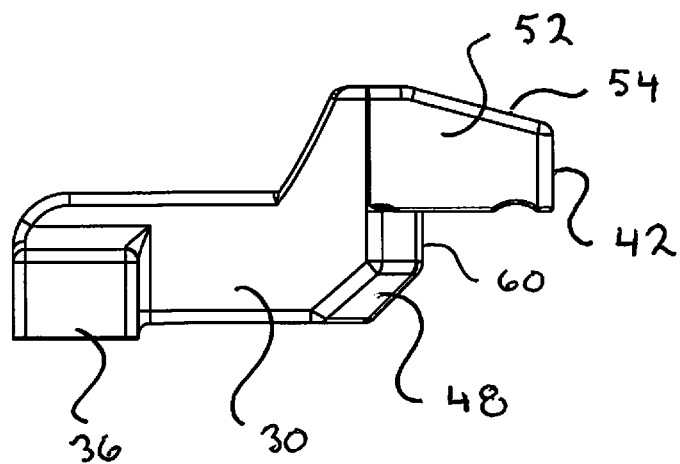
FIG. 10 is a right side view of the vise clamp body.
Figure 11:
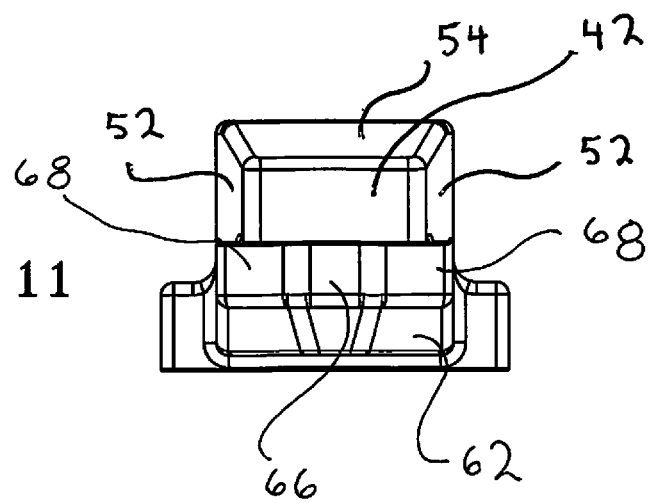
FIG. 11 is a nose or front end view of the vise clamp body.
Figure 12:
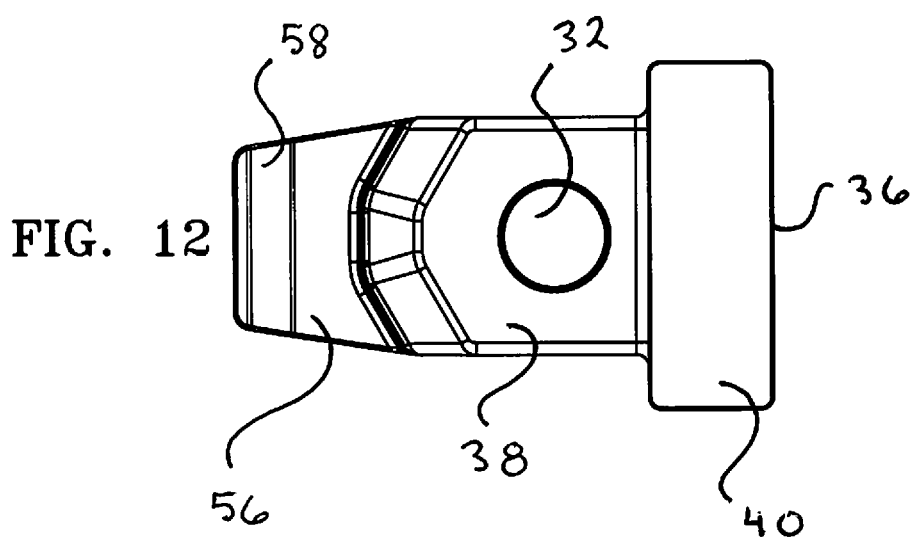
FIG. 12 is a bottom view of the vise clamp body.
Figure 13:
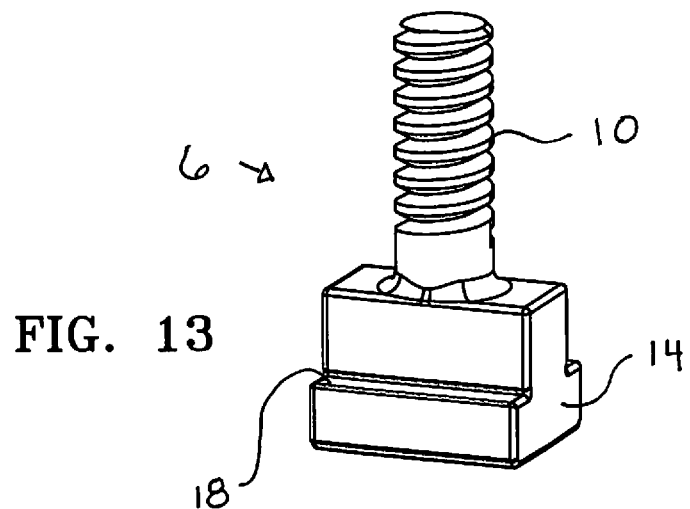
FIG. 13 is a side perspective view of the T bolt.
Figure 14:
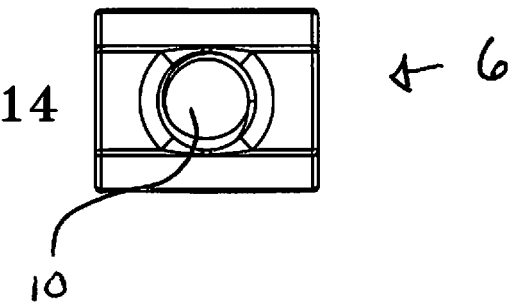
FIG. 14 is a top view of the T bolt.
Figure 15:
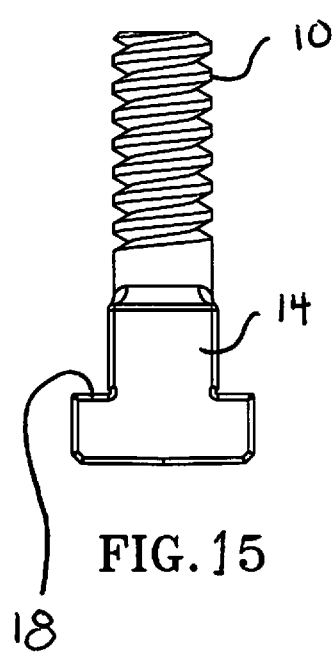
FIG. 15 is a back view of the T bolt.
Figure 16:
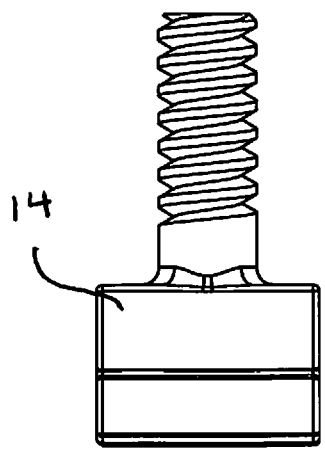
FIG. 16 is a right side view of the T bolt.
Figure 17:
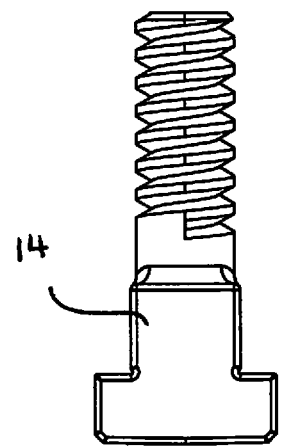
FIG. 17 is a front view of the T bolt.
Figure 18:
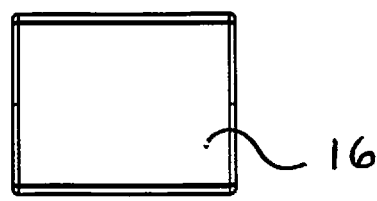
FIG. 18 is a bottom view of the T bolt.
Figure 19:
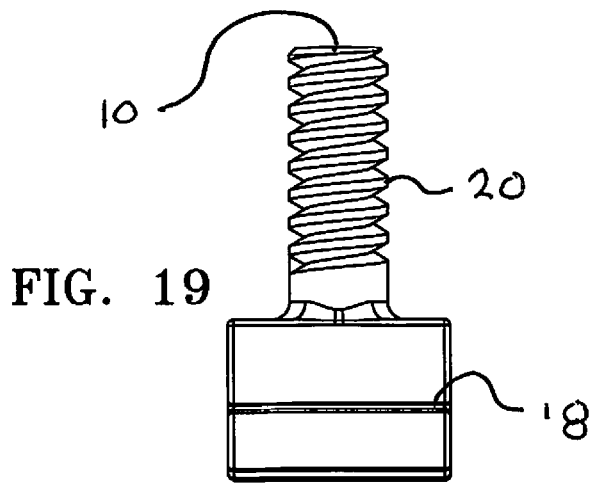
FIG. 19 is a left side view of the T bolt.
Figure 20:
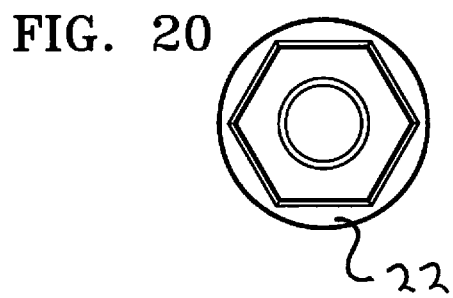
FIG. 20 is a top view of the T nut.
Figure 21:
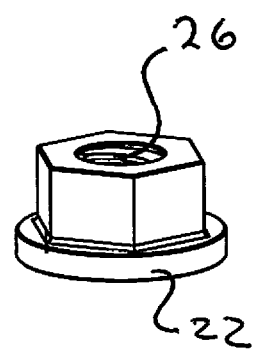
FIG. 21 is a perspective side view of the T nut.
Figure 22:
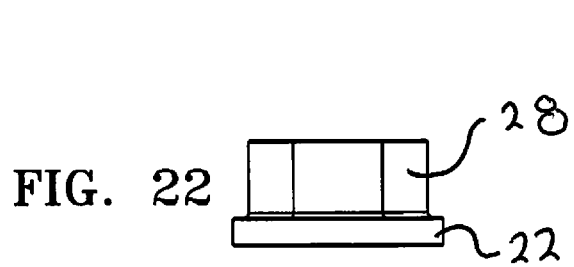
FIG. 22 is a right side view of the T nut.
Figure 23:
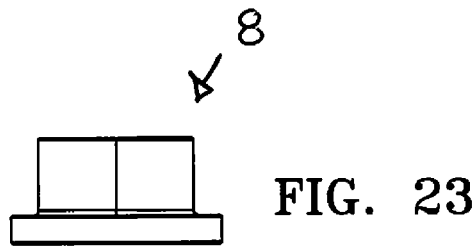
FIG. 23 is a left side view of the T nut.
Figure 24:
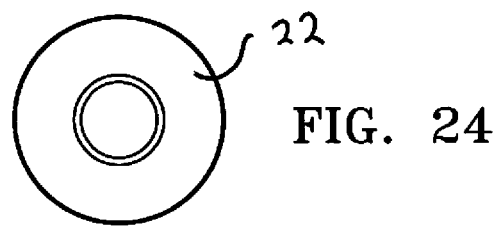
FIG. 24 is a bottom view of the T nut.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for a clamp to be used on a slotted work table such as would be found on a commercial milling machine. It may be used to secure a vise that holds the work piece or to secure the work piece itself directly to the slotted work table.

Looking at FIGS. 1-5 the vise clamp 2 can best be seen. It is comprised of a vise clamp body 4, a T bolt 6 and a T nut 8.

The T bolt 6 has a T shaped solid cylindrical body 14 (preferably made of a high carbon content hardened steel) from which a threaded stud 10 extends from the approximate center of its top face 12. (FIGS. 13-19) The bottom segment of the T bolt 6 has the widest dimension of the T bolt, as its top face (known as the shoulder 18) will be drawn into frictional contact with the top face of the slotted channel in the slotted work table. The bottom face 16 of the T bolt is planar and the distance between the bottom face and the shoulders 18 is less than the standardized depth of the channel in commercial slotted work tables so as to allow for the siding adjustment of the T bolt 6 in the channel before its T nut 8 is threaded downwards, drawing the shoulders 18 upward and into frictional contact with the work table. The preferred thread 20 for the threaded stud 10 is a course 14 mm metric thread.

Turning now to FIGS. 20-24 the T nut 8 can be described. This T nut 8 is a double thick wall nut and has a peripheral flange 22 extending normally from its bottom edge so as to simulate a washer, spreading out the clamping force onto the vise body's top face 24. (FIGS. 2 and 3) Its internal thread 26 is matingly conformed to the 14 mm external metric thread of the threaded stud 10, however its hexagonal body is dimensioned as a ¾ inch imperial dimension. This serves the purpose of preventing the T bolt and T nut combination designed and provided with the vise clamp 2, from being mis-matched with any lower grade, inferior nut or bolt. This ensures that the proper sized and strength mechanical members for the vise clamp body 4 are always used together.

The novel aspects of the design of the clamp body 4 is discussed with reference to FIGS. 6-12. The vise clamp body 4 is a one piece. solid, preferably cast but alternatively machined element. In the preferred embodiment it has an overall length of approximately 3⅝" from the nose proximal face 42 of its nose 44 to the back of its pressure foot 36. It has a height of 1.407" and its nose 44 rises 0.700" above the top face 46 of the central block 30. The central block 30 has a central bolting orifice 32 formed therethrough. At the distal end 34 of the central block 30 is a generally rectangular block that functions as the pressure foot 36 for the device 2. This linear pressure foot 36 extends below the bottom face 38 of the clamp body 4 and also extends out perpendicularly from the side walls of the central block 30. The pressure foot 36 has a planar bottom face 40. This pressure foot is dimensioned so as to be large enough to span across the slots in a slotted work table regardless of what angle the vise clamp 2 is affixed to the slotted work table. It has enough area on its bottom face 40 so that it will not ever tip into a slot. In the preferred embodiment the pressure foot 36 is 2½₂" long, ¾" wide and ½" high.

Figure 25:
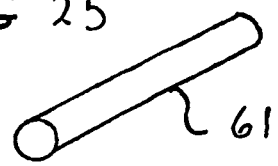
FIG. 25 is a perspective side view of the anchor dowel.
Figure 26:
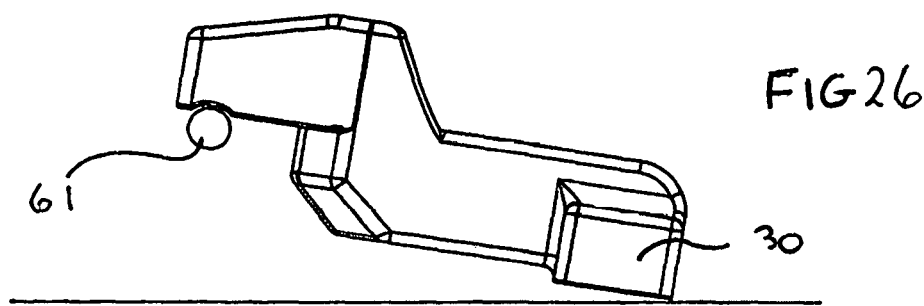
FIG. 26 is a perspective view of the body and anchor dowel as used in a clamping environment.

There is a nose 44 at the proximal end of the central block 30 that extends above and forward of the central block 30. The entire distal nose face 50 of this nose 44 is a vertically angled arc 41 to allow the clearance of a box end or open end wrench or an imperial socket fitted onto the double thick side walls of the T nut 8. At the bottom of this distal nose face 50 there is enough clearance for the peripheral flange 22 to sit flush onto the top face 46 of the central block 30. The nose 44 also has nose side faces 52 and a nose top face 54 that each taper inward towards the planar, vertical proximal nose face 42 for the purpose of allowing tooling clearance. Across the entire width of the nose bottom face 56 there is as arced groove 58 cut. This has a 0.165" radius to accommodate the anchor dowel 61. (FIGS. 25 and 26.) In the preferred embodiment this radius has been chosen to accommodate a ⁵⁄₁₆ inch or 8 mm dowel pin.

The front face 48 of the proximal end of central block 30 has six separate angled faces. There is an upper (contact) vertical row 60 and a lower (relief) angled row 62 each with at least three separate faces. These two rows 60 and 62 are adjacent one another. Generally any vise clamp is positioned with its body perpendicular to the linear axis of the vise/work piece to be clamped. The upper vertical row 60 is designed to provide three planar faces, any one of which may be placed in contact with one of the sides of the vise or work piece when the vise, work piece or clamp 2 is angularly placed on the slotted work table with respect to the linear axis of the slots. Although described with two rows of three faces each, alternate embodiments may utilize different numbers of faces at different angles.

In conventional, prior art, rectangular vise clamps when the vise clamp is rotated or angled with respect to the vise or work piece the main body of the vise clamp moves away form the vise/work piece and the amount of area of contact between the bottom face of the nose and the vise/work piece is reduced. This is due to the physical interference by the corners of the vise clamp. There is also just an unstable point contact between the side of the vise clamp and the side of the vise/work piece. The vise clamp 2 has a central face 66 that is perpendicular to the linear axis of the vise clamp 2 and two side faces 68 extending 30 degrees back from its vertical plane. With the present vise clamp 2 the two 30 degree angled faces in the upper (contact) vertical row 60 allow the vise clamp 2 to be rotated 30 degrees either direction and still maintain good side contact and stability with the vise/work piece, and good nose coverage onto the vise/work piece.

The lower (relief) angled row 62 has three similar faces aligned with the three faces in the upper (contact) vertical row 60, but they are angled away from their vertical planes approximately 45 degrees. This provides relief clearance as the vise clamp 2 may be clamped on an angle as shown in FIG. 26.

It is to be noted that the vertical thickness (height) of the nose 44 is dimensioned so as to be less than the 1 inch reference CAD operational tooling lower limits. It is also to be noted that the vertical thickness (height) of the nose 44 exceeds the height of the T nut so that nothing extends above the top of the vise clamp body 4.

Figure 27:
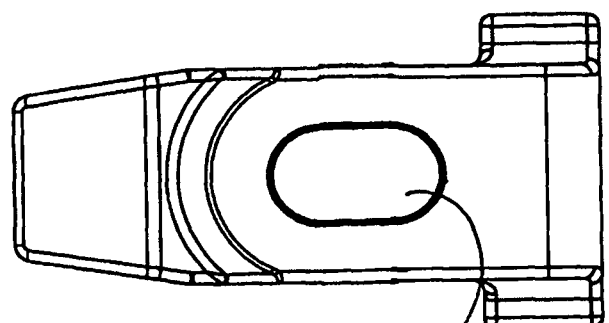
FIG. 27 is a top view of the first alternate embodiment vise clamp body.

FIG. 27 shows an alternate embodiment vise clamp 70 that has an enlongated, slotted bolting orifice 72 to accommodate finer adjustment and range of motion of the vise clamp 2 on the slotted table. Basically, the vise clamp 2 may be brought closer to the vise/work piece. The vise clamp body 4 may or may not be lengthened.

Figure 28:
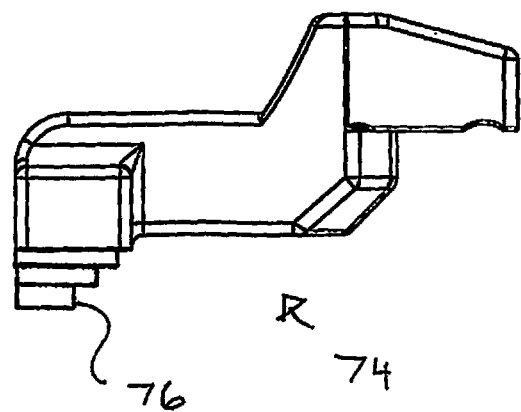
FIG. 28 is a side view of the second alternate embodiment vise clamp body.

FIG. 28 shows a second alternate embodiment 74 of the vise clamp that utilizes a stepped pressure foot 76. This type of vise clamp is used with specific tooling and clamps. There is a plethora of stepped configurations that may be employed at the pressure foot end of the vise clamp 2. These employ uniform steps that may be in, above, below, or both above and below the central block 30.

In operation, the vise clamp 2 is positioned nest to the vise/work piece such that one of the three faces in upper (contact) vertical row 60 is placed into contact with the vise/work piece; only the pressure foot is contacting the slotted table; and the nose 44 is adequately positioned over the vise/work piece. The T bolt's cylindrical body 14 is slid into the slot on the slotted work table into a position appropriate for passage of its threaded stud through the bolting orifice of the vise clamp 2. If there is a peripheral lip on the vise a dowel pin 61 (having a diameter greater than the height of the vise lip) is placed onto the top of the vise underneath the arced groove 58 in the nose 44. The T nut 8 is threaded onto the T bolt and tightened to a secure clamping force. The reduced area of the pressure foot increases the pressure per unit area compared to that if there were no pressure foot, thereby increasing the clamping ability of the vise clam. The dowel pin allows the clamping pressure to reside on the top surface of the vise/work piece rather than the raise peripheral rim which would wear away under heavy milling operations of have too little surface area to adequately keep the vise from shaking under load.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A vise clamp comprising:
a clamp body made of a central block having a proximal end, a distal end, two sides, a planar top face and a planar bottom face, said central block having a linear pressure foot formed at said distal end and extending below said bottom planar face;
said clamp body having a single orifice formed there through, and a nose formed at said proximal end that extends above and forward of said proximal end, said nose having a distal nose face that is entirely arced and vertically angled, two nose side faces and a nose top face that each angle inwards towards a planar, vertical, proximal nose face, and a bottom nose face with an arced groove formed there across;
a T bolt having a metric thread formed thereon and sized for passage through said orifice;
a double thick walled T nut having a metric thread formed therein and an external hexagonal profile dimensioned for mating engagement by imperial sized tools, said T nut having a peripheral flange extending normally from its bottom edge;
and
a dowel pin sized for contact within said arced groove and for maintaining spaced contact between said nose and a workpiece.

2. The vise clamp of claim 1 wherein said proximal end of said central block has at least one angled face.

3. The vise clamp of claim 2 wherein said proximal end of said central block has an upper vertical row of a first set of at least three angled faces.

4. The vise clamp of claim 3 wherein said proximal end of said central block has a lower angled row of a second set of at least three angled faces, said upper vertical row adjacent said lower angled row.

5. The vise clamp of claim 4 wherein said first set of at least three angled faces include a central planar vertical face and two side planar vertical faces angled approximately 30 degrees behind a plane of said central planar vertical face.

\* \* \* \* \*